United States Patent [19]

Mark et al.

[11] 4,231,920

[45] Nov. 4, 1980

[54] TRANSPARENT TO TRANSLUCENT FLAME-RETARDANT POLYCARBONATE COMPOSITION

[75] Inventors: Victor Mark, Evansville; Charles V. Hedges, Mt. Vernon, both of Ind.

[73] Assignee: General Electric Company, Pittsfield, Mass.

[21] Appl. No.: 6,473

[22] Filed: Jan. 25, 1979

[51] Int. Cl.[2] .................................................. C08K 5/42

[52] U.S. Cl. .......................... 260/45.7 S; 260/29.2 R; 260/30.8 R; 260/31.8 R; 260/32.6 R; 260/33.4 R; 260/DIG. 24

[58] Field of Search ..................... 260/39.2 R, 30.6 R, 260/30.8 R, 31.8 R, 31.2 R, 32.6 R, 33.4, 45.7 S, 45.8 RW, DIG. 24

[56] References Cited

U.S. PATENT DOCUMENTS 3,294,741 12/1966 Schnell et al. .................. 260/29.2 R

*Primary Examiner*—Donald E. Czaja
*Assistant Examiner*—W. Thompson
*Attorney, Agent, or Firm*—Salvatore C. Mitri; William F. Mufatti

[57] ABSTRACT

A transparent to translucent flame-retardant polycarbonate composition comprising a mixture of an aromatic carbonate polymer and a flame-retardant additive which can be the metal salts of organic sulfonic acids and a coadditive which can be a solvent for said metal salts.

13 Claims, No Drawings

TRANSPARENT TO TRANSLUCENT FLAME-RETARDANT POLYCARBONATE COMPOSITION

This invention is directed to an improved transparent to translucent flame-retardant polycarbonate composition. More particularly, this invention is directed to a high molecular weight aromatic polycarbonate containing in admixture therewith: (a) an alkali or alkaline earth metal salt of an organic sulfonic acid, or mixtures of said salts; and (b) a coadditive that acts as a solvent for said salts or mixtures thereof, said compositions exhibiting improved optical characteristics over those containing only said salts while maintaining high flame retardancy.

BACKGROUND OF THE INVENTION

With the increasing concern for safety, there is a need to provide safe materials for public and household use, including flame retardant transparent or translucent products for use by the consumer. As a result, many products are now required to meet certain flame retardant criteria byy local and federal governments as well as by the manufactures of such products. One set of conditions employed as a standard for measuring flame retardancy is set forth in Underwriters' Laboratories, Inc. Bulletin 94 pursuant to which materials are rated for flame retardant characteristics.

In the art, there are many known flame retardant additives which are employed by mixing them with the products to be rendered flame retardant. Such flame retardant additives have been known to be employed in amounts of about 5 to 20 weight percent in order to be effective to resist burning of those products with which they are employed. It has been found, however, that at these concentrations these flame retardant additives can have a degrading effect upon the products with which they are employed, thereby often resulting in the loss of valuable physical properties of the base product. This is particularly evident when known flame retardant additives are employed with polycarbonate resins, as many of these additives have a degrading effect upon the polymer.

In many instances, it is desirable that articles produced from fire retardant polycarbonate resins retain their transparent to translucent characteristics.

DESCRIPTION OF THE INVENTION

It has now been found that a high molecular weight aromatic polycarbonate can be made flame retardant while retaining its transparent to translucent characteristics by incorporating with the aromatic polycarbonate about 0.001–10.0 parts per hundred parts of aromatic polycarbonate of a selected flame retardant additive system. The flame retardant additives are selected such that they are inert, do not degrade the aromatic polycarbonate and yet retain the transparent to translucent characteristics of the base polycarbonate resin.

The additive system employed comprises a composite of: (a) alkali or alkaline earth metal salts of organic sulfonic acids or mixtures thereof; and (b) a coadditive selected from the group consisting of protic and aprotic polar organic substances and water, these coadditives being solvents for the flame retardant organic sulfonate salts.

The organic alkali metal and organic alkaline earth metal salts or mixtures thereof which can be employed are disclosed in the following U.S. Patents, all of which are assigned to the same assignee as this case and which are all incorporated herein by reference:

U.S. Pat. No. 3,933,734 which discloses a flame retardant polycarbonate composition comprising a mixture of an aromatic polycarbonate and a flame retardant additive which can be the metal salts of either monomeric or polymeric aromatic sulfonic acids, or mixtures thereof.

U.S. Pat. No. 3,948,851 which discloses a flame retardant polycarbonate composition comprising a mixture of an aromatic polycarbonate and a flame retardant additive which can be the metal salts of either monomeric or polymeric aromatic sulfonesulfonic acids, or mixtures thereof.

U.S. Pat. No. 3,926,908 which discloses a flame retardant polycarbonate composition comprising a mixture of an aromatic polycarbonate and a flame retardant additive which can be the metal salts of sulfonic acids of aromatic ketones, or mixtures thereof.

U.S. Pat. No. 3,919,167 which discloses a flame retardant polycarbonate composition comprising a mixture of an aromatic polycarbonate and a flame retardant additive which can be the metal salts of heterocyclic sulfonic acids, or mixtures thereof.

U.S. Pat. No. 3,909,490 which discloses a flame retardant polycarbonate composition comprising a mixture of an aromatic polycarbonate and a flame retardant additive which can be the metal salts of sulfonic acids of aromatic sulfides, or mixtures thereof.

U.S. Pat. No. 3,953,396 which discloses a flame retardant polycarbonate composition comprising a mixture of an aromatic polycarbonate and a flame retardant additive which can be the metal salts of either monomer or polymeric aromatic ether sulfonic acids, or mixtures thereof.

U.S. Pat. No. 3,931,100 which discloses a flame retardant polycarbonate composition comprising a mixture of an aromatic polycarbonate and a flame retardant additive which can be the metal salts of aliphatic and olefinic sulfonic acids, and mixtures thereof.

U.S. Pat. No. 3,978,024 which discloses a flame retardant polycarbonate composition comprising a mixture of an aromatic polycarbonate and a flame retardant additive which can be the metal salts of either monomeric or polymeric phenol ester sulfonic acids, or mixtures thereof.

U.S. Pat. No. 3,953,399 which discloses a flame retardant polycarbonate composition comprising a mixture of an aromatic polycarbonate and a flame retardant additive which can be the metal salts of sulfonic acids of monomeric and polymeric aromatic carboxylic acids and esters, or mixtures thereof.

U.S. Pat. No. 3,917,559 which discloses a flame retardant polycarbonate composition comprising a mixture of an aromatic polycarbonate and a flame retardant additive which can be the metal salts of halocycloaliphatic aromatic sulfonic acids.

U.S. Pat. No. 3,951,910 which discloses a flame retardant polycarbonate composition comprising a mixture of an aromatic polycarbonate and a flame retardant additive which can be the metal salts of either monomeric or polymeric aromatic amide sulfonic acids, or mixtures thereof.

U.S. Pat. No. 3,940,366 which discloses a flame retardant polycarbonate composition comprising a mixture of an aromatic polycarbonate and a flame retardant additive which can be the metal salts of either monomeric or polymeric aromatic sulfonic acids, or mixtures thereof.

In addition to the salts disclosed in the U.S. Patents identified above, there are several classes of alkali or alkaline earth metal salts that yield non-opaque flame retardant, aromatic polycarbonate compositions based upon their refractive indices. These salts are disclosed in the following U.S. Patents, all of which are assigned to the same assignee as this case and which are all incorporated herein by reference.

U.S. Pat. No. 4,001,175 which discloses a non-opaque flame retardant polycarbonate composition comprising a mixture of an aromatic polycarbonate and a flame retardant additive which can be the metal salts of sulfonic acids of aromatic sulfoxides, the aromatic polycarbonate and the additive each having a refractive index in the range of 1.54 to 1.65.

U.S. Pat. No. 4,007,155 which discloses a non-opaque flame retardant polycarbonate composition comprising a mixture of an aromatic polycarbonate and a flame retardant additive which can be the metal salts of aliphatic sulfonic acids, the aromatic polycarbonate and the additive each having a refractive index in the range of 1.54 to 1.65.

U.S. Pat. No. 4,039,509 which discloses a non-opaque flame retardant polycarbonate composition comprising a mixture of an aromatic polycarbonate and a flame retardant additive which can be the metal salts of heterocyclic sulfonic acids, the aromatic polycarbonate and the additive each having a refraction index in the range of 1.54 to 1.65.

U.S. Pat. No. 4,067,846 which discloses a non-opaque flame retardant polycarbonate composition comprising a mixture of an aromatic polycarbonate and a flame retardant additive which can be the metal salts of sulfonic acids of aromatic sulfides, the aromatic polycarbonate and the additive each having a refraction index in the range of 1.54 to 1.65.

U.S. Pat. No. 4,073,768 which discloses a non-opaque flame retardant polycarbonate composition comprising a mixture of an aromatic polycarbonate and a flame retardant additive which can be the metal salts of sulfonic acids of monomeric or polymeric phenol esters, the aromatic polycarbonate and the additive each having a refractive index in the range of 1.54 to 1.65.

U.S. Pat. No. 4,092,291 which discloses a non-opaque flame retardant polycarbonate composition comprising a mixture of an aromatic polycarbonate and a flame retardant additive which can be the metal salts of sulfonic acids of aromatic sulfones, the aromatic polycarbonate and the additive each having a refraction index in the range of 1.54 to 1.65.

U.S. Pat. No. 4,104,245 which discloses a non-opaque flame retardant polycarbonate composition comprising a mixture of an aromatic polycarbonate and a flame retardant additive which can be the metal salts of monomeric or polymeric substituted aromatic sulfonic acids, the aromatic polycarbonate and the additive each having a refractive index in the range of 1.54 to 1.65.

U.S. Pat. No. 4,110,307 which discloses a non-opaque flame retardant polycarbonate composition comprising a mixture of an aromatic polycarbonate and a flame retardant additive which can be the metal salts of monomeric or polymeric aromatic ether sulfonic acids, the aromatic polycarbonate and the additive each having a refractive index in the range of 1.54 to 1.65.

U.S. Pat. No. 4,115,354 which discloses a non-opaque flame retardant polycarbonate composition comprising a mixture of an aromatic polycarbonate and a flame retardant additive which can be the metal salts of monomeric or polymeric aromatic sulfonic acids, the aromatic polycarbonate and the additive each having a refractive index in the range of 1.54 to 1.65.

The alkali and alkaline earth metal salts enumerated above are employed in the range of about 0.01–5.0 parts per hundred parts of the polycarbonate resin.

Pursuant to this invention, it has been found that when the above-identified salts are employed with an aromatic polycarbonate resin in the presence of a coadditive that serves as a solvent for the salt and which is compatible with and chemically stable under the processing conditions of the polycarbonate, an optically improved flame retardant polycarbonate composition is obtained. Thus, an opaque, binary resin-salt composite can become as translucent as a ternary resin-salt solvent composite. Or, a translucent resin-salt composite can become as transparent as a ternary resin-salt-solvent composite. Further, an already transparent resin-salt composite can be produced to exhibit lower haze and higher light transmission characteristics upon the addition of a suitable, coadditive solvent as a ternary resin-salt-solvent composite.

The coadditive solvents that can be used to increase the light transmission characteristics of flame retardant polycarbonate compositions can be liquid or solid at ambient temperature and are thus capable of forming solutions of the salts that are also liquid or solid at ambient temperature. For best optical properties, it is desirable that solutions of salts that are solid at ambient temperature become liquid at the temperatures at which the polycarbonate is processed which can often be as high as 380° C. It is possible, sometimes even desirable, to employ coadditive solvents which have boiling points below the processing temperatures of the polycarbonate and are thus partially eliminated due to evaporation during processing as improved optical characteristics are apparent even when the coadditive solvent is present at very low concentrations in the polycarbonate resin. In the latter case, the role of the coadditive solvent appears to be that of a dispersant thereby enabling the flame retardant salt additive to become incorporated in the polycarbonate resin in a finely divided form.

The coadditive solvents of the invention can be members selected from the group consisting of water, organic protic compounds, and organic aprotic compounds. As is known to those skilled in the art, the term "aprotic" identifies those substances which neither yield nor accept a proton. Similarly, the term "protic" identifies those substances which can yield or accept a proton.

Organic aprotic compounds include, but are not limited to, such substances as $C_1$–$C_4$ mono- and di-carboxamides; N-methylated and N,N-methylated $C_1$–$C_4$ mono- and di-carboxyamides, as well as the cyclic $C_4$–$C_6$ carboximides; $C_2$–$C_{12}$ dialkyl sulfoxides, alkyl aryl and diaryl sulfoxides; $C_2$–$C_{14}$ dialkyl, alkyl aryl and diaryl sulfones as well as substituted diaryl sulfones wherein the substituents can be $C_1$–$C_6$ alkyl and halogens such as chlorine, bromine and fluorine; cyclic $C_4$–$C_{12}$ alkyl, alkaryl and aryl sulfones; $C_1$–$C_{12}$ mono- and di-sulfonamides; N-methylated, N,N-dimethylated $C_1$–$C_{12}$ mono- and di-sulfoxamides; and the like.

Illustrative of such organic aprotic substances are such compounds as dimethyl formamide, dimethyl acetamide, N-methyl pyrrolidone, tetramethyl urea, N-methyl lactic amide, dimethyl sulfone, diphenyl sulfoxide, diphenyl sulfone, methyl phenyl sulfone, bis(4-chlorophenyl)sulfone, ditolyl sulfone, tetramethylene sulfone, dihydro-1-benzothiophene dioxide, dihydro-2-benzothiophene dioxide, dibenzothiophene dioxide, tetramethyl sulfamide; and the like.

Organic protic compounds include, but are not limited to, such substances as $C_1$–$C_4$ alcohols; $C_2$–$C_6$ glycols, triols and polyols; $C_1$–$C_4$ mono- and di-carboxylic acids; $C_2$–$C_4$ mono- or di-hydroxy mono- or di-carboxylic acids; N-hydroxyethylated and N,N-bis(hydroxylated) $C_1$–$C_{12}$ mono- and di-sulfonamides and N-alkylated and hydroxyethylated phosphoramides; and the like.

Illustrative of such organic protic substances are such compounds as methyl alcohol, ethylene glycol, glycerol, pentaerythritol, mannitol, bis(hydroxyethyl) urea, acetic acid, oxalic acid, lactic acid, N,N′,N″-tris(hydroxyethyl)phosphoramide; and the like.

The coadditive solvents of the invention can be employed in amounts of about 0.01–5.0 parts per hundred parts resin and, preferably, in the form of a solution of the salts in the solvents. In the case of solid solutions, these are best added to the polycarbonate resin powder in finely divided forms such as those resulting from pulverization, grinding, milling, and the like. In some combinations it is advantageous to remelt the solid solution and administer it in liquid form as is done with solutions that are liquid at ambient temperature.

Of the foregoing organic protic and protic substances identified above, dimethylformamide, dimethyl acetamide, dimethyl sulfone, tetramethylene sulfone, diphenyl sulfone, acetic acid and water are preferred. However, it should be noted that it is known to use water with a flame retardant salt additive as disclosed in U.S. Pat. No. 4,113,695 to provide a binary additive system. But, use of water with another coadditive solvent, such as those of this invention, to provide a ternary additive system has not been heretofore employed.

The high molecular weight aromatic polycarbonates that can be employed in the practice of this invention are homopolymers and copolymers that are prepared by reacting a dihydric phenol with the carbonate precursor and which typically have an intrinsic viscosity (I.V.) of about 0.40–1.0 dl/g as measured in methylene chloride at 25° C.

The dihydric phenols that can be employed are bisphenols such as bis(4-hydroxyphenyl)methane, 2,2-bis(4-hydroxyphenyl)propane (hereinafter referred to as bisphenol-A), 2,2-bis(4-hydroxy-3-methylphenyl)-propane, 4,4-bis(4-hydroxyphenyl)pentane, 4,4-bis(4-hydroxyphenyl)heptane, 2,2-(3,5,3′,5′-tetrachloro-4,4′-dihydroxydiphenyl)propane, 2,2-(3,5,3′,5′-tetrabromo-4,4′-dihydroxydiphenyl) propane, (3,3′-dichloro-4,4′-dihydroxydiphenyl)propane, etc.; dihydric phenol ethers such as bis(4-hydroxyphenyl)ether, etc.; dihydroxybiphenyls such as p,p′-dihydroxybiphenyl, etc.; dihydroxyaryl sulfones such as bis(4-hydroxyphenyl)-sulfone, bis(3,5-dimethyl-4-hydroxy-phenyl)sulfone, etc.; dihydroxy benzenes, resorcinol, hydroquinone, alkyl-substituted dihydroxy benzenes such as 1,4-dihydroxy-3,5-dimethylbenzene, etc.; and dihydroxy diphenyl sulfoxides such as bis(4-hydroxy-phenyl)sulfoxide, etc. Other dihydric phenols can also be employed such as are disclosed in U.S. Pat. Nos. 2,999,835, 3,028,365 and No. 3,153,008 which are incorporated herein by reference.

Of course it is possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic polycarbonates of the invention. Blends of any of the above materials can also be employed to provide the aromatic polycarbonate.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate, di-(halophenyl) carbonate, such as di-(chlorophenyl) carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, etc., or mixtures thereof. Suitable haloformates include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric materials of a dihydric phenol, a dicarboxylic acid and carbonic acid. These are disclosed in U.S. Pat. No. 3,169,121 which is incorporated herein by reference.

The aromatic polycarbonates of the invention are typically prepared by employing a molecular weight regulator, an acid acceptor and a catalyst. The molecular weight regulators which can be employed include phenol, cyclohexanol, methanol, para-tertiary-butylphenol, etc. Preferably phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkali earth metal.

The catalysts which can be employed are those that typically aid the polymerization of the monomer with phosgene. Suitable catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. These polyfunctional aromatic compounds contain at lease three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride and trimellitic acid or their acid halide derivatives.

Blends of linear and branched aromatic polycarbonates are also included within the scope of this invention.

The polycarbonate compositions of the invention are prepared by admixing the aromatic polycarbonate with the organic alkali metal or alkaline earth metal salts and the coadditive solvents either separately or as a solid or as a liquid solution of the salt in the coadditive solvent.

DESCRIPTION OF THE PREFERRED EMBODIMENT

The following examples are set forth to illustrate the best mode currently known to practice the invention. Unless otherwise specified, parts or percents are by weight.

EXAMPLE 1

One hundred parts of a high molecular weight aromatic polycarbonate powder, prepared by reacting 2,2-bis(4-hydroxyphenyl) propane (bisphenol-A) and phosgene in the presence of an acid acceptor and a molecular weight regulator and having an intrinsic viscosity of 0.57 dl/g in methylene chloride at 25° C., was mixed with 0.2 parts potassium diphenylsulfone-4-sulfonate in finely divided form. The resulting mixture was then fed to an extruder which was operated at about 265° C., and the extrudate was comminuted into pellets.

The pellets were then molded at about 315° C. into test plaques measuring 2 in. by 3 in. by 0.062 in., using conventional molding techniques. The optical properties of the test samples were measured using the G. E. Recording Spectrophotometer and haze determinations were made on Gardner Hazemeter. The results obtained are set forth in the Table.

The pellets were also injection molded at about 315° C. into test bars measuring about 5 in. by ½ in. by about 1/16–⅛ in. thick. The test bars (5 for each additive listed in the Table) were subjected to the test procedure set forth in Underwriters' Laboratories, Inc. Bulletin 94, Burning Test for Classifying Materials (hereinafter referred to as UL-94). In accordance with this test procedure, materials so investigated are rated either UL-94 V-O, UL-94 V-I, UL-94 V-II, based on the results of 5 specimens. The criteria for each V rating per UL-94 is briefly as follows:

"UL-94 V-0": Average flaming and/or glowing after removal of the igniting flame shall not exceed 5 seconds and none of the specimens shall drip particles which ignite absorbent cotton.

"UL-94 V-I": Average flaming and/or glowing after removal of the igniting flame shall not exceed 25 seconds and one of the specimens shall drip particles which ignite absorbent cotton.

"UL-94 V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of this invention, as "burning". Further, UL-94 requires that all test bars must meet the V type rating to achieve the particular rating. Otherwise, the 5 bars receive the rating of the worst single bar. For example, if one bar is classified as V-II and the other four (4) are classified as V-O, then the rating for all 5 bars is V-II.

EXAMPLE 2

Example 1 was repeated except that the aromatic polycarbonate powder was mixed with a warm solution (ι50° C.) of 0.20 parts of potassium diphenylsulfone-4-sulfonate in 0.60 parts of water. The optical and flame retardant characteristics of the resultant polymer are shown in the Table.

EXAMPLES 3 to 18

The procedures of Example 1 were repeated with the formulations shown in the Table along with the results of the optical and flame retardant test data obtained for these examples.

In the ensuing Table, the "Control" identifies the polycarbonate resin without any additives and the following abbreviations are used to identify some of the coadditive solvents employed:

DMA—N,N-Dimethyl acetamide (b.p., 165° C.)
NMP—N-Methyl pyrrolidone (b.p., 197° C.)
TMS—Tetramethylene sulfone (b.p., 285° C.)
DPS—Diphenyl sulfone (b.p., 379° C.)(m.p., 125° C.)
DMS—Dimethyl sulfone (b.p., 233° C.)(m.p., 109° C.)
DMF—N,N-Dimethyl formamide (b.p., 153° C.)
DPSO—Diphenyl sulfoxide (m.p., 69°–71° C.)
DCDPS—Dichlorodiphenyl sulfone (m.p., 142°–143° C.)

TABLE

Optical and Flame Retardant Properties of Transparent to Translucent Polycarbonates

| Example | Salt Additive | pph | Solvent Coadditive | pph | Light Transmission (%) | Haze (%) | UL-94 Rating |
|---|---|---|---|---|---|---|---|
| Control | — | — | — | — | 89.8 | 0.6 | Burning |
| 1 | Potassium diphenyl-sulfone-4-sulfonate | 0.2 | — | — | 88.4 | 4.7 | V-I |
| 2 | Potassium diphenyl-sulfone-4-sulfonate | 0.2 | $H_2O$ | 0.6 | 89.6 | 0.9 | V-0 |
| 3 | Potassium diphenyl-sulfone-4-sulfonate | 0.2 | DMA | 0.2 | 89.1 | 1.6 | V-0 |
| 4 | Potassium diphenyl-sulfone-4-sulfonate | 0.2 | NMP | 0.2 | 87.3 | 2.2 | V-I |
| 5 | Potassium diphenyl-sulfone-4-sulfonate | 0.2 | TMS | 0.2 | 89.1 | 1.0 | V-0 |
| 6 | Potassium diphenyl-sulfone-4-sulfonate | 0.2 | DPS | 0.6 | 88.6 | 1.2 | V-0 |
| 7 | Potassium diphenyl- | 0.1 | DMS | 0.5 | 89.0 | 1.4 | V-0 |

TABLE-continued

| Optical and Flame Retardant Properties of Transparent to Translucent Polycarbonates | | | | | | | |
|---|---|---|---|---|---|---|---|
| Example | Salt Additive | pph | Solvent Coadditive | pph | Light Transmission (%) | Haze (%) | UL-94 Rating |
| | sulfone-4-sulfonate | | | | | | |
| 8 | Potassium diphenyl sulfone-4-sulfonate | 0.2 | DMF | 0.2 | 89.2 | 0.9 | V-0 |
| 9 | Sodium trichloro-biphenyl sulfonate | 0.5 | — | — | 87.4 | 3.8 | V-0 |
| 10 | Sodium trichloro-biphenyl sulfonate | 0.4 | TMS | 0.5 | 89.3 | 2.9 | V-0 |
| 11 | Sodium trichloro-biphenyl sulfonate | 0.1 | Glycol | 0.1 | 89.6 | 0.9 | V-0 |
| 12 | Sodium-1,1-dichloro-2,2-diphenylethylene sulfonate | 0.3 | — | — | 88.9 | 2.2 | V-I |
| 13 | Sodium-1,1-dichloro-2,2-diphenylethylene sulfonate | 0.3 | DPSO | 0.3 | 88.9 | 1.8 | V-0 |
| 14 | Polysodium polystyrene polysulfonate | 0.1 | — | — | 88.6 | 2.4 | V-I |
| 15 | Polysodium polystyrene polysulfonate | 0.1 | DCDPS | 0.2 | 88.7 | 1.8 | V-0 |
| 16 | Potassium salt of phenyl 2,4,5-trichlorobenzenesulfonate-4'-sulfonic acid | 0.1 | — | — | 86.4 | 1.7 | V-II |
| 17 | Potassium salt of phenyl 2,4,5-trichlorobenzenesulfonate-4'-sulfonic acid | 0.2 | DMF | 0.2 | 86.9 | 1.7 | V-0 |
| 18 | Potassium diphenyl-sulfone-3-sulfonate | 0.2 | $H_2O$ / DMF | 0.6 / 0.1 | 89.9 | 0.8 | V-0 |

It is evident from the results shown in the foregoing Table that a composition comprising a mixture of an aromatic polycarbonate, a flame retardant organic salt and a coadditive that acts as a solvent for the salt exhibits superior light transmission and, often, superior flame retardancy over compositions without the coadditive solvent.

What is claimed is:

1. A transparent to translucent and flame retardant polycarbonate composition comprising a mixture of a high molecular weight aromatic polycarbonate; a minor amount of a flame retardant salt selected from the group consisting of organic alkali or organic alkaline earth metal salts of sulfonic acids or mixtures thereof; and, a minor amount of a coadditive solvent selected from the group consisting of water, organic protic compounds or organic aprotic compounds, or mixtures thereof.

2. The composition of claim 1 in which the aromatic carbonate is the reaction product of 2,2-bis(4-hydroxyphenyl)propane.

3. The composition of claim 1 wherein the flame retardant salt is sodium trichlorobiphenyl sulfonate.

4. The composition of claim 1 wherein the flame retardant salt is sodium 1,1-dichloro-2,2-diphenylethylene sulfonate.

5. The composition of claim 1 wherein the flame retardant salt is potassium diphenylsulfone sulfonate.

6. The composition of claim 1 wherein the flame retardant salt is potassium trifluoromethanesulfonate.

7. The composition of claim 1 wherein the coadditive solvent is selected from the group comprising $C_1$–$C_4$ alcohols; $C_2$–$C_6$ glycols, triols and polyols; $C_1$–$C_4$ mono- and di-carboxylic acids; $C_2$–$C_6$ hydroxycarboxylic acids; $C_1$–$C_4$ mono- or di-carboxamides; N-methylated-, N,N-dimethylated-, N-hydroxyethylated, N,N-bis(-hydroxyethylated) mono- and di-carboxamides, including cyclic $C_4$–$C_6$ carboxamides; $C_2$–$C_{12}$ dialkyl, alkyl aryl and diaryl sulfoxides; $C_2$–$C_{14}$ dialkyl, alkyl aryl and diaryl sulfones; substituted diaryl sulfones, wherein the substituents are $C_1$–$C_6$ alkyl, chlorine, bromine and fluorine; cyclic $C_4$–$C_{12}$ alkyl, alkyl aryl and aryl sulfones; $C_1$–$C_{12}$ mono- and di-sulfonamides; N-methyl, N,N-dimethyl, N-hydroxyethyl and N,N-bis(hydroxyethyl) $C_1$–$C_{12}$ mono- and di-sulfonamides; N-polyalkylated and N-poly(hydroxyethylated) phosphoramides; and mixtures thereof.

8. The composition of claim 7 wherein the coadditive solvent is dimethylformamide.

9. The composition of claim 7 wherein the coadditive solvent is N-methylpyrrolidone.

10. The composition of claim 7 wherein the coadditive solvent is tetramethylenesulfone.

11. The composition of claim 7 wherein the coadditive solvent is ethylene glycol.

12. The composition of claim 1 wherein the coadditive solvent is a mixture of water and dimethylformamide.

13. The composition of claim 1 wherein the flame retardant salt and the coadditive solvent each are present in amounts of about 0.01–5.0 parts per hundred parts of the aromatic polycarbonate.

* * * * *